United States Patent
Ahmad et al.

(10) Patent No.: US 9,409,653 B2
(45) Date of Patent: Aug. 9, 2016

(54) AUXILLIARY POWER AND THRUST UNIT DRIVE SYSTEM

(71) Applicant: THE BOEING COMPANY, Chicago, IL (US)

(72) Inventors: Parvez N. Ahmad, Akron, OH (US); David Ellis, Elkton, MD (US)

(73) Assignee: THE BOEING COMPANY, Chicago, IL (US)

( * ) Notice: Subject to any disclaimer, the term of this patent is extended or adjusted under 35 U.S.C. 154(b) by 147 days.

(21) Appl. No.: 14/488,403

(22) Filed: Sep. 17, 2014

(65) Prior Publication Data
US 2016/0075442 A1   Mar. 17, 2016

(51) Int. Cl.
| | |
|---|---|
| B64D 41/00 | (2006.01) |
| F01D 5/12 | (2006.01) |
| F01D 5/02 | (2006.01) |
| F01D 9/02 | (2006.01) |
| F01D 15/12 | (2006.01) |
| F02C 7/32 | (2006.01) |
| F02C 7/36 | (2006.01) |

(52) U.S. Cl.
CPC *B64D 41/00* (2013.01); *F01D 5/02* (2013.01); *F01D 5/12* (2013.01); *F01D 9/02* (2013.01); *F01D 15/12* (2013.01); *F02C 7/32* (2013.01); *F02C 7/36* (2013.01); *F05D 2220/50* (2013.01); *F05D 2240/12* (2013.01); *F05D 2240/24* (2013.01)

(58) Field of Classification Search
CPC ............ B64D 41/00; F02C 7/32; F02C 7/36; F01D 15/12; F01D 9/02; F01D 5/02; F01D 5/12; F05D 2240/24; F05D 2220/50; F05D 2240/12
See application file for complete search history.

(56) References Cited

U.S. PATENT DOCUMENTS

| | | | |
|---|---|---|---|
| 2,619,795 | A | 12/1952 | Drake |
| 3,489,377 | A | 1/1970 | Pearson et al. |
| 3,680,309 | A | 8/1972 | Wallace, Jr. |

(Continued)

FOREIGN PATENT DOCUMENTS

| | | |
|---|---|---|
| DE | 1816064 A1 | 7/1969 |
| GB | 924078 A | 4/1963 |

(Continued)

OTHER PUBLICATIONS

Extended European Search Report for EP Application No. 15185670.5-1607 dated Feb. 10, 2016.

(Continued)

*Primary Examiner* — Valentina Xavier
(74) *Attorney, Agent, or Firm* — Marshall, Gerstein & Borun LLP

(57) ABSTRACT

An aircraft auxiliary power and thrust unit includes at least one blade mounted to a fan shaft which are mounted to a tail cone of the aircraft and rotatable relative to the tail cone. Also included is an air intake assembly which includes an opening defined by the tail cone and a channel in fluid communication with the opening and the at least one blade. A first drive shaft positioned to extend in a direction transverse to the fan shaft and engageable to rotate with the fan shaft and first drive shaft engaged and the first drive shaft engageable to a second drive shaft positioned transverse to the first drive shaft such that the second drive shaft rotates with the first drive shaft with the first and second drive shafts engaged. The second drive shaft is positioned outside of the channel of the air intake.

24 Claims, 2 Drawing Sheets

(56) References Cited

U.S. PATENT DOCUMENTS

| | | | |
|---|---|---|---|
| 3,834,161 | A | 9/1974 | Quigley, Jr. et al. |
| 6,247,668 | B1 | 6/2001 | Reysa et al. |
| 2006/0163425 | A1* | 7/2006 | Brown .................. B64D 41/00 244/53 B |
| 2008/0098743 | A1* | 5/2008 | Judd ...................... B64D 33/04 60/772 |
| 2010/0251726 | A1* | 10/2010 | Jones ........................ F02C 7/32 60/773 |
| 2012/0011839 | A1* | 1/2012 | Kandil .................... F01D 17/26 60/445 |

FOREIGN PATENT DOCUMENTS

| | | |
|---|---|---|
| GB | 1212875 A | 11/1970 |
| GB | 1503394 A | 3/1978 |
| WO | WO-9805553 A1 | 2/1998 |

OTHER PUBLICATIONS

FAA TSO-C77a and JAR-APU, Change2, Model Specification Model 331-500 (B) Gas Turbine Auxiliary Power Unit, dated Apr. 10, 1995.

Britt Metal Processing, www.brittmetal.com, entitled "Repair Capabilities for the AlliedSignal GTCP 331 APU".

Boeing 777 Aircraft Maintenance Manual, CH 49-Airborne Auxiliary Power, 170 pages.

Article in Flight International Magazine, Long Tale Boeing 777-300 Technical Description and Cutaway Drawing Dated Dec. 3-9, 1997.

The Boeing 777 Program Background, www.boeing.com/commercial/777family/background.html About the 777 Family, 7th Paragraph Referenced Jun. 26, 1995.

Flight International Magazine 15, article entitled "Boeing Studies Triple-Engined 777X," by Guy Norris, Los Angeles, dated Jul. 15, 1998, p. 5, 1 sheet.

Flight International Magazine 9, article entitled "Dawn of the Auxiliary", by Guy Norris, Los Angeles dated Dec. 15, 1998, pp. 40-41.

* cited by examiner

AUXILLIARY POWER AND THRUST UNIT DRIVE SYSTEM

FIELD

The present invention relates to aeronautics and aircraft power plants, and more particularly, to the production of power to operate auxiliary equipment in an aircraft and provide thrust to the aircraft.

BACKGROUND

Auxiliary power units (APU's) have been used on board aircraft to provide power to support auxiliary equipment such as electrical systems, pressurized hydraulic systems, environmental control systems typically powered with the aircraft positioned on the ground. These APU's were problematic in that they were a source of significant weight and cost. It has been proposed to replace these APU's with auxiliary power and thrust units (APTU's), as seen in U.S. Pat. No. 6,247,668. The APTU's serve not only to provide power to auxiliary equipment but can also serve to provide additional thrust power to the aircraft at a time of takeoff and/or climb of the aircraft.

A need exists for APTU's which serve to provide the aircraft an efficient power source for operating hydraulic, electrical and environmental systems typically while the aircraft is on the ground during boarding and de-boarding operations and serve to provide the aircraft an additional thrust source at the time of takeoff and climbing to altitude. With the need for such a versatile power system source as the APTU, there is also a need to improve on its performance, reliability and versatility to operate within limited space provided on board the aircraft.

SUMMARY

It is an object of the present invention to provide an improved aircraft auxiliary power and thrust unit APTU for an aircraft, which includes at least one blade mounted to a fan shaft wherein the at least one blade and fan shaft are mounted to a tail cone of the aircraft wherein the at least one blade and fan shaft are rotatable relative to the aircraft. An air intake assembly is included which includes an opening defined by the tail cone and a channel in fluid communication with the opening and the at least one blade, along with a first drive shaft positioned to extend in a direction transverse to the fan shaft with a first end portion of the drive shaft engageable with the fan shaft such that the fan shaft and the first drive shaft rotate together with the first end portion of the first drive shaft and the shaft engaged. Additionally, a second drive shaft is positioned to extend in a direction transverse to the first drive shaft with a first end portion of the second drive shaft engageable with a second end portion of the first drive shaft such that rotation of the first drive shaft imparts rotation to the second drive shaft with the first end portion of the second drive shaft and the second end portion of the first drive shaft engaged and wherein the second drive shaft is positioned outside of the channel of the air intake.

Another object of this invention is to provide a method of operating an auxiliary power and thrust unit of an aircraft, which includes the step of initiating operation of the auxiliary power and thrust unit source which includes a at least one blade mounted to a fan shaft wherein the at least one blade and fan shaft rotate relative to the aircraft. This method further includes the step of applying the power source to operate in one of two modes. A first mode is the fan shaft is linked with a shaft assembly comprising a first shaft which directs rotational mechanical force in a first direction transverse to the shaft and a second drive shaft linked to the first drive shaft which directs the rotational mechanical force received from the first drive shaft in a second direction transverse to the first direction wherein the second drive shaft is positioned outside of an air intake assembly comprising an opening in a tail cone of the aircraft and a channel in fluid communication with the opening and the at least one blade or a second mode wherein the shaft assembly is positioned disconnected from the fan shaft.

BRIEF SUMMARY OF THE DRAWINGS

The features, functions, and advantages that have been discussed can be achieved independently in various embodiments or may be combined in yet other embodiments further details of which can be seen with reference to the following description and drawings.

DESCRIPTION

Figure 1:
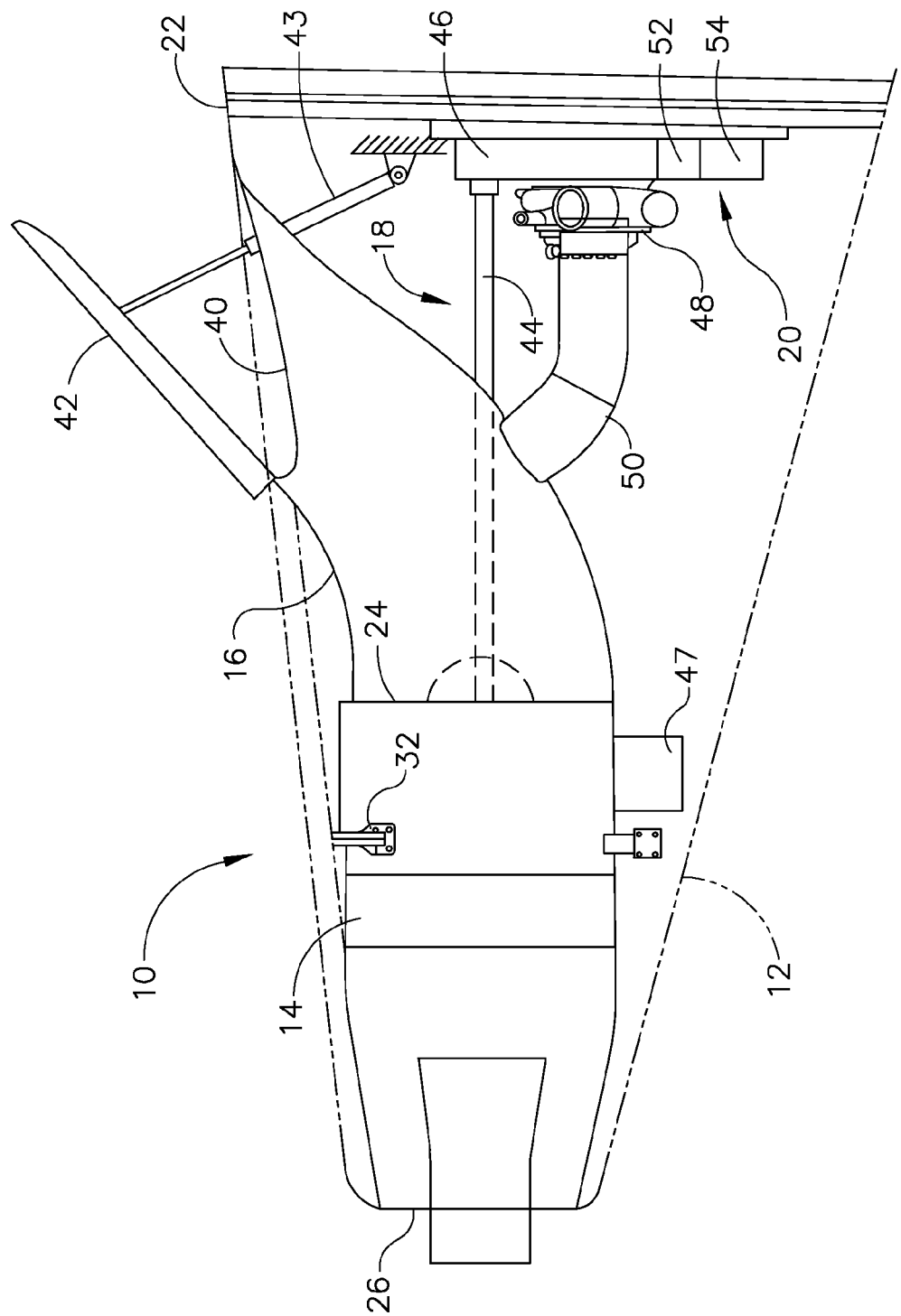
FIG. 1 is a partial broken away schematic view of a tail cone of an aircraft showing an installed auxiliary power and thrust unit APTU of the Prior Art.

In referring to FIG. 1, this is a view of an embodiment of the prior art invention relating to auxiliary power and thrust units APTU's as set forth in U.S. Pat. No. 6,247,668 issued Jun. 19, 2001, and owned by The Boeing Company of Seattle, Wash. This invention in the prior art portrays an APTU 10 which was a replacement for conventional aircraft auxiliary power unit APU systems. This APTU 10 provides power to support conventional auxiliary equipment on the aircraft, as well as provides takeoff and in-flight thrust. APTU 10 is positioned in an aircraft tail cone 12. The power source shown is a turbo fan engine 14. It is further shown an inlet duct 16 which feeds engine 14 an air flow from an opening 40 of tail cone 12. A transmission assembly 18 which are components arranged to connect and transmit rotational mechanical force from the power source or engine 14 to conventional auxiliary equipment 20. This auxiliary equipment 20 would include, for example, electrical generators 54, hydraulic pressure supply unit 52, compressor 48, etc. The power source will replace an auxiliary power unit APU and power the auxiliary equipment with APTU 10 operating in a mode to power such auxiliary equipment 20 and with the power source or engine 14 disconnected from the auxiliary equipment 20 the engine 14 could be used to operate in a second mode to provide an additional thrust source for the aircraft at takeoff and climbing to altitude.

In this prior art embodiment of FIG. 1, a turbo fan engine 14 includes an intake end 24 and an exhaust end 26. As is shown, the engine 14 is located in the interior of the tail cone 12 such that the exhaust end 26 is positioned to expel exhaust out of the rear of tail cone 12. Any number of various turbo fan engines and the like could be employed for engine 14 that would have a range of operation that would meet the needs of the mission requirements of the aircraft. The turbo fan engine 14 is mounted to the tail cone 12 with brackets 32 and is accessible by doors that provide access to the tail cone 12 area of the aircraft.

The tail cone 12 defines an opening 40 for the intake of air which has a variable positioned door 42 secured to the aircraft by way of actuator 43. The positioning of the door can direct varying amounts of ambient air into channel or inlet duct 16 from opening 40 as needed. The air, as can be appreciated, is directed into the intake end 24 of turbo fan engine 14.

With using APTU 10 while the aircraft is on the ground to run auxiliary equipment 20, the engine 14 will typically draw sufficient air with door 42 being open without requiring additional assistance with another fan. Inlet duct 16 is formed of a heat resistant fire-proof material. Opening 40 can have any number of configurations. The inlet duct 16 can also have a variety of cross sectional configurations so long as the aft end of inlet duct 16 has a circular cross section so as to be compatible with engine intake end 24 of engine 14.

In FIG. 1, transmission assembly 18 is provided to transmit rotary power from engine 14 main turbine shaft to various auxiliary equipment 20, as mentioned herein. Assembly 18 includes a drive shaft 44 mounted to the engine 14 main turbine shaft (not shown). Shaft 44 is axially secured to the main turbine shaft of engine 14 and extends through inlet duct 16. To accommodate this configuration of shaft 44 passing through inlet duct 16, inlet duct 16 includes openings through which the drive shaft can pass. In this embodiment of the prior art, the auxiliary equipment box 20 is attached to gearbox 46. In another embodiment, the transmission assembly includes a drive shaft mounted perpendicular to the engine main turbine shaft to a gearbox located on the underside of the engine 14, such as within an engine accessories unit 47.

As mentioned earlier, auxiliary equipment 20 may include various conventional items such as an electrical generator, hydraulic pressure supply unit. a compressor etc. These are auxiliary equipment 20 items are mounted on gearbox 46 attached to structural members at firewall 22. The drive shaft 44 is axially connected to gearbox 46. Gearbox 46 is connected to a compressor 48, that receives input air from an air supply duct 50 connected between the compressor 48 and air inlet duct 16. The rotational mechanical force imparted by shaft 44 to gear box 46 is transmitted to provide power to drive a hydraulic pressure supply unit 52 and an electrical generator 54. The forward end of the drive shaft 44 may be disengaged from the gearbox components by a powered clutch device within gearbox 46 when auxiliary services are not required and re-engaged when desired. As can be appreciated, APTU 10 is capable of serving the purpose of providing rotary power to run auxiliary equipment 20.

Turbo fan engine 14 will be operated at a lower power setting with the aircraft on the ground and auxiliary equipment 20 is needed to be powered. Inlet door 42 is typically in an open position providing turbo fan engine 14 ambient air for powering the engine. At the time of takeoff and climb the turbo fan engine 14 would be disconnected from powering the auxiliary equipment 20 of the aircraft. The inlet door 42 would be open at a proper position to power the engine for thrust. The engine would be set to operate at a higher power setting providing the needed thrust to the aircraft for takeoff and climbing to altitude. During cruise operations APTU 10 is not normally used for providing thrust. At that point inlet door 42 is normally closed to reduce drag. If auxiliary power is needed during cruise, the inlet door 42 may be opened and turbo fan engine 14 may be operated at an appropriate lower setting to power certain auxiliary equipment 20 and accessories. Additionally, turbo fan engine 14 is available on standby should an engine failure occur and thrust power may be needed.

Figure 2:
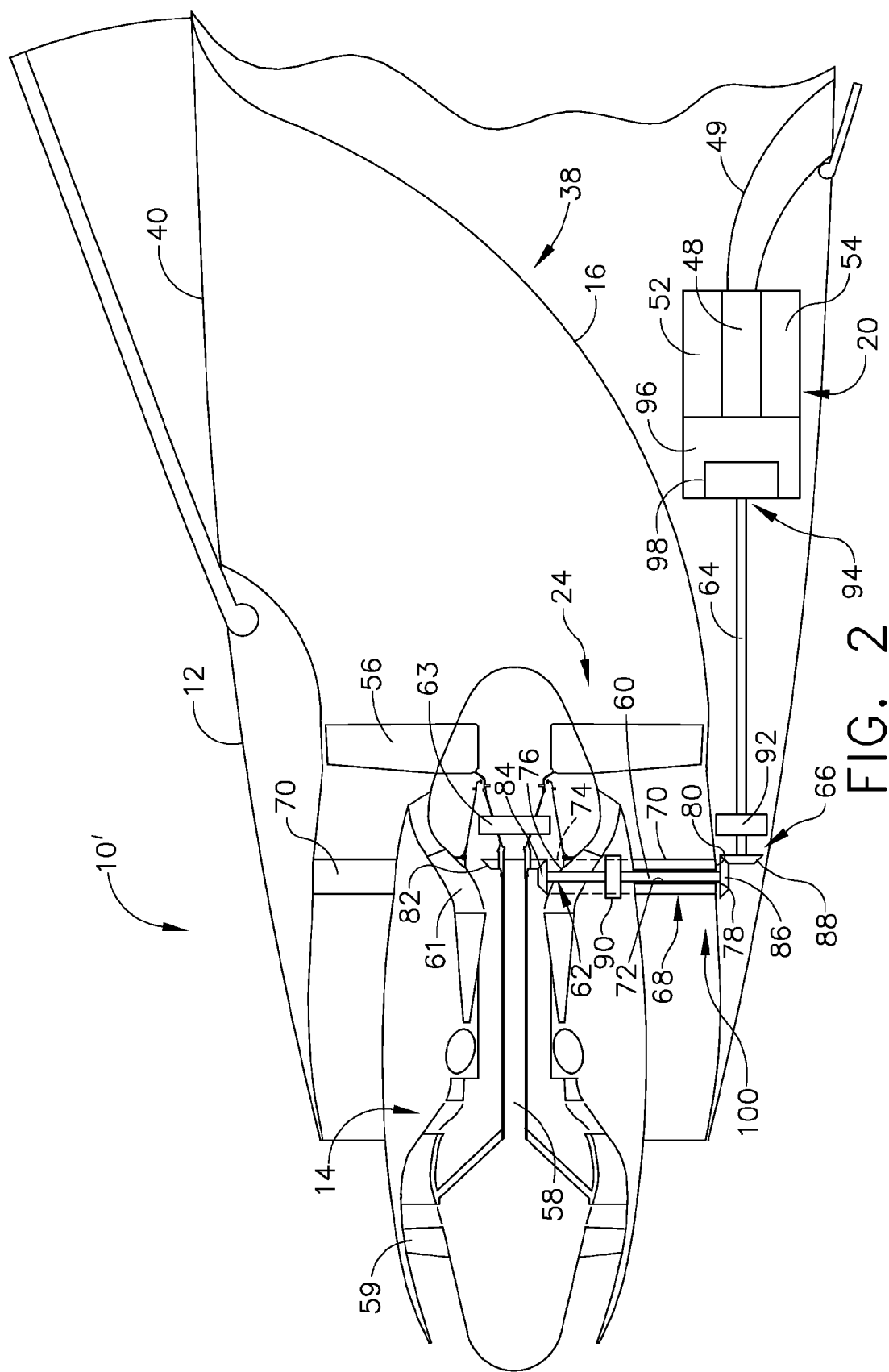
FIG. 2 is a partial broken away schematic view of a tail cone of an aircraft showing an installed embodiment of the improved auxiliary power and thrust unit APTU of the present invention.

In referring to FIG. 2, an improved embodiment of the auxiliary power and thrust unit APTU 10' is shown. It should be noted where components are operatively the same as the prior art the same numbering will be applied to this figure. As can be seen, in this embodiment, a turbo fan engine 14 is shown, however, it is contemplated that many different types of engines or electric motors may be utilized to provide rotational power in the improved APTU 10' unit. It is common for these rotational power sources to have at least one blade and commonly a plurality of blades mounted to shaft 58. In this embodiment, the plurality of blades include turbine blades 59, compressor blades 61 and fan blades 56 mounted to fan shaft 58. The power source or engine 14 is mounted within tail cone 12 and blades 59, 61 and 56 and shaft 58 are rotatable relative to tail cone 12. In FIG. 2, the embodiment of the power source of engine 14 is a turbo fan engine.

An air intake assembly 38 is shown. Air intake assembly 38 includes an opening 40 defined in the wall of tail cone 12 and channel or inlet duct 16 which is in fluid communication with opening 40 and blades 59, 61 and 56. A first drive shaft 60 is positioned transverse or perpendicular to shaft 58. A first end portion 62 of drive shaft 60 is engageable with shaft 58 such that with the rotation of shaft 58 first drive shaft 60 will rotate together at the same time with shaft 58. Second drive shaft 64 is positioned to extend in a direction transverse or perpendicular to first drive shaft 60. Second drive shaft 64 has a first end portion 66 which is engagable with a second end portion 68 of first drive shaft 60. With engagement of first end portion 66 of second drive shaft 64 with second end portion 68 of first drive shaft 60 the first and second drive shafts 60, 64, is such that rotation of the first drive shaft 60 imparts, at the same time, rotation to the second drive shaft 64.

In this embodiment of first and second drive shafts 60, 64 which rotationally engage shaft 58, second drive shaft 64 is in offset alignment with shaft 58 and is positioned outside of inlet duct 16 of the air intake assembly 38. This embodiment also positions first drive shaft 60 coming off of the shaft 58 to be positioned outside of channel or duct 16 thereby preventing any air flow obstruction that would otherwise be caused by either of first and second drive shafts 60, 64 being positioned within or otherwise passing through channel 16 prior to the air passing through inlet duct 16 reaching intake end 24 of engine 14. As a result, optimal power can be obtained from engine 14 which would impact on the efficiency of engine 14 providing power for thrust or for powering auxiliary equipment 20.

This configuration or positioning of first and second drive shafts 60, 64 relative to shaft 58 also permits positioning accessory equipment 20 outside of channel or inlet duct 16. This configuration also provides the opportunity to optimize use of the limited space in tail cone 12 and avoid use of complicated configurations of inlet duct 16 to avoid obstructions. This construction also provides an opportunity to use more compact drive shaft runs. More compact drive shaft runs provide the need for less support to the drive shaft and less likelihood of a drive shaft moving out of alignment.

Further reduction of obstructive air flow is provided with respect to first drive shaft 60 that is positioned to engage shaft 58 of engine 14. Typically in turbo fan engines 14 of this embodiment, a plurality of guide vanes 70 are positioned spaced apart from shaft 58 and extend in a radial direction from shaft 58. These guide vanes 70 are aerodynamically shaped and positioned to provide desired air flow that has passed through fan blades 56. In this embodiment, at least one guide vane 70 defines an open channel 72 that extends through the length of guide vane 70. At one end 74 of guide vane 70 an opening 76 is positioned and another opening 78 is positioned on opposing end 80 of guide vane 70.

With first drive shaft 60 positioned within channel 72 first end portion 62 of first drive shaft 60 extends outside opening 76 and a second end portion 68 of first drive shaft 60 extends out of other opening 78 of the opposing end 80 of guide vane 70. With a significant portion of first drive shaft 60 enclosed within guide vane 70, the air flow beyond fan blades 56 is exposed to the aero dynamic shape of guide vane 70 and not to a configuration different from guide vane 70 such as that of first drive shaft 60. Thus, without obstructed air flow going into intake end 24 of engine 14 or inconsistent airflow within engine 14, optimum production of the power source or engine 14 can be obtained.

In this embodiment, the transmission of rotational mechanical force is transmitted from shaft 58 through to second drive shaft 64 by way of intermeshing gearing positioned between shaft 58 and first drive shaft 60 and between first drive shaft 60 and second drive shaft 64. Shaft 58 includes a first gear 82 positioned about shaft 58. First end portion 62 of first drive shaft 60 includes second gear 84 positioned about first drive shaft 60. First and second gears 82, 84 are complementary and configured to engage or intermesh with one another such that with the rotation, for example, of shaft 58, first shaft 60 will also rotate at the same time. The second end portion 68 of the first drive shaft 60 includes a third gear 86 positioned about the first drive shaft 60 and the first end portion 66 of the second drive shaft 64 includes a fourth gear 88 positioned about the second drive shaft 64. Similarly, third and fourth gears 86, 88 are complimentary and configured to engage or intermesh with one another such that with the third and fourth gears 86, 88 meshed together the first and second drive shafts 60, 64 rotate at the same time.

In the operation of APTU 10' for powering auxiliary equipment 20, rotational mechanical forces will need to be transmitted from shaft 58 to auxiliary equipment 20, through the linkage of first and second drive shafts 60, 64. However, when engine 14 is to be utilized for producing thrust for the aircraft, this linkage will be disconnected for operating engine 14 at a higher setting for producing usable thrust for the aircraft. This disconnecting can be accomplished in various ways. In this embodiment a powered clutch can be positioned for disconnecting the above described meshed gear connections. For example, a powered clutch 90 could be associated with second gear 84 to remove second gear 84 out of engagement with first gear 82. Additionally or alternatively, a powered clutch 92, for example, could be associated with the fourth gear 88 to remove fourth gear 88 out of engagement with third gear 86. In contrast, the aircraft may be positioned on the ground and linkage of drive shafts 60, 64 are not fully engaged and there is a need to power and operate auxiliary equipment 20, clutches 90 and/or 92 could be used to reconnect the linkage of first and second drive shafts 60, 64 and connect first drive shaft 60 with fan shaft 58 such that engine 14 can provide power to the auxiliary equipment 20.

Second end portion 94 of second drive shaft 64 engages gearbox 96. Second end portion 94 provides gearbox 96 with rotational mechanical power when engine 14 is operating and first and second drive shafts 60, 64 are connected to fan shaft 58. In turn, gearbox 96 is linked to auxiliary equipment 20 so as to transmit the rotational mechanical power to auxiliary equipment 20 such as, at least one of, a hydraulic pressure system 52, an electrical generation system 54 and a compressor 48. It can be noted that air supply for compressor 48 can be provided through air inlet 49 receiving air from an opening in tail cone 12.

As mentioned above, with the configuration of first and second drive shafts 60, 64, auxiliary equipment 20 is also positioned outside of channel or inlet duct 16 thereby avoiding unwanted obstructed air flow entering intake 24 of engine 14. Additionally, another powered clutch 98 is provided to permit engagement and disengagement of second drive shaft 64 from gearbox 96 so as provide another way of engaging engine 14 to drive auxiliary equipment and also provide for disengagement for purposes of using engine 14 for thrust operations.

In this embodiment wherein a turbo fan engine 14 is used, it is typical that plurality of fan blades 56 would be disengaged from shaft 58 with engine 14 operating in the first mode to provide auxiliary power. Compressor and turbine blades 59, 61 would provide sufficient power for auxiliary purposes once engine 14 has been started by conventional means. Disengagement of the plurality of fan blades 56 would be accomplished by using a powered clutch 63 which would dismount plurality of fan blades 56 from shaft 58 if they were engaged and mount plurality of fan blades 56 to shaft 58 if they were not engaged. With the need for engine 14 to provide more thrust for takeoff or for climbing powered clutch 63, for example, which is positioned in this embodiment between the plurality of blades and shaft 58, would assure plurality of fan blades 56 are mounted to shaft 58 to provide the additional needed power.

An improved method is provided for operating this improved auxiliary power and thrust unit APTU 10' of an aircraft. The power source or engine 14 is initiated or started by any number of conventional means. As discussed above the power source or engine 14 can be a wide variety of engines or motors having a at least one blade mounted to shaft 58 which rotate together relative to the aircraft. The embodiment shown in FIG. 2 is a turbo fan engine, as previously mentioned. This power source or engine 14 can be utilized in one of two modes. The first mode includes shaft 58 being linked to a shaft assembly 100 which includes first and second drive shafts 60, 64 such that mechanical rotational force from shaft 58 rotates first and second drive shafts 60, 64 as described earlier.

First drive shaft 60 is positioned to extend in a direction transverse or perpendicular to fan shaft 58 and second drive shaft 64 is linked to first drive shaft 60 and extends in a direction transverse or perpendicular to the first drive shaft 60. Second drive shaft 64 is positioned, as mentioned above, outside of an inlet duct 16 of an air intake assembly 38 wherein the inlet duct 16 is in fluid communication with an opening 40 in the tail cone 12 and blades 59, 61 and 56. This provides the unobstructed air flow entering engine 14 and at the same time second drive shaft 64 imparts mechanical rotational power to gearbox 96 which in turn provides rotational mechanical power to auxiliary equipment 20. As mentioned above, with operating in the first mode powered clutch 63 can assure fan blades 56 are not mounted to shaft 58 and auxiliary power can be provided by compressor and turbine blades 59 and 61. A second mode of operation of APTU 10' is to disconnect assembly 100 such that mechanical rotational power does not reach the auxiliary equipment 20. As was discussed above, a use of a powered clutch, as earlier described herein, in this embodiment, would achieve this disconnection. In the second mode of operation, powered clutch 63 would be used to assure plurality of fan blades 56 are mounted to shaft 58 such that the added power can be produced by engine 14 and thereby provided as thrust for the aircraft. With the disconnection of assembly 100 accomplished and the mounting of plurality of fan blades 56 assured, engine 14 can be powered up to be used in the second mode to provide thrust to the aircraft when needed for takeoff and/or climbing to altitude.

As can be appreciated in operation of the APTU 10', with the aircraft on the ground and there is a need to operate auxiliary equipment 20, engine 14 is typically set at a low or minimum setting of power when operating in the first mode.

A low power setting allows for efficient transmission of power to auxiliary equipment 20 and has the benefit of increasing the engine life, reduce exhaust velocities and temperatures, as well as, reduce ramp noise. In the second mode with the disconnection of the linkage assembly 100 from transmitting mechanical rotational power from the shaft 58 to auxiliary equipment 20, with powered clutch 63 engaged mounting plurality of fan blades 56 to shaft 58, and engine 14 placed at a higher setting of power more commensurate to that of the other thrust engines on the aircraft, engine 14 is available to provide thrust to the aircraft for assisting takeoff and climbing to altitude. Controls are provided in the cockpit to operate APTU 10' for providing power to auxiliary equipment 20 of the first mode these controls can assure proper linkage of shaft assembly 100 with engagement of clutches mentioned herein and the disconnection of the plurality of fan blades 56 from shaft 58 with powered clutch 63. Similarly, controls are provided in the cockpit to operate APTU 10' as a thrust power source with providing controls for the disconnection of the linkage assembly 100 by way of the one or more of the clutches described herein in the second mode and in this embodiment, mounting of the plurality of fan blades 56 to shaft 58 with powered clutch 63. Thus, control of auxiliary or thrust operation of APTU 10' can be easily done from the cockpit.

While various embodiments have been described above, this disclosure is not intended to be limited thereto. Variations can be made to the disclosed embodiments that are still within the scope of the appended claims.

What is claimed:

1. An improved aircraft auxiliary power and thrust unit (10') for an aircraft, comprising:
    at least one blade (56, 59, 61) mounted to a fan shaft (58) wherein the at least one blade and the fan shaft are mounted to a tail cone (12) of the aircraft wherein the at least one blade and the fan shaft are rotatable relative to the aircraft;
    an air intake assembly (38) comprising an opening (40) defined by the tail cone and a channel (16) in fluid communication with the opening and the at least one blade;
    a first drive shaft (60) positioned to extend in a direction transverse to the fan shaft with a first end portion (62) of the first drive shaft engageable with the fan shaft such that the fan shaft and the first drive shaft rotate together with the first end portion of the first drive shaft and the shaft engaged; and
    a second drive shaft (64) positioned to extend in a direction transverse to the first drive shaft with a first end portion (66) of the second drive shaft engageable with a second end portion (68) of the first drive shaft such that rotation of the first drive shaft imparts rotation to the second drive shaft with the first end portion of the second drive shaft and the second end portion of the first drive shaft engaged and wherein the second drive shaft is positioned outside of the channel of the air intake assembly.

2. The improved aircraft auxiliary power and thrust unit of claim 1 wherein the at least one blade comprises a plurality of blades.

3. The improved aircraft auxiliary power and thrust unit of claim 2 wherein the plurality of blades comprise a plurality of compressor blades, a plurality of turbine blades and a plurality of fan blades wherein the plurality of fan blades are removably mounted to the shaft.

4. The improved aircraft auxiliary power and thrust unit of claim 3 wherein a powered clutch (63) associated with the plurality of fan blades mounts the plurality of the fan blades to the shaft and removes the plurality of fan blades from the shaft.

5. The improved aircraft auxiliary power and thrust unit of claim 4 wherein the plurality of fan blades are positioned between the channel of the air intake assembly and at least one guide vane (70).

6. The improved aircraft auxiliary power and thrust unit of claim 5 wherein the at least one guide vane comprises one end (80) positioned spaced apart from the shaft and extends in a radial direction from the shaft.

7. The improved aircraft auxiliary power and thrust unit of claim 6 wherein the at least one guide vane defines an open channel (72) which extends throughout a length of the at least one guide vane positioning an opening (76) at the one end of the guide vane and an another opening (78) positioned on an opposing end of the at least one guide vane.

8. The improved aircraft auxiliary power and thrust unit of claim 7 wherein the first drive shaft is positioned to extend through the open channel of the guide vane with the first end portion of the first drive shaft extending outside of the opening at the one end and a second end portion of the first drive shaft extending out of the other opening at the opposing end of the of the guide vane.

9. The improved aircraft auxiliary power and thrust unit of claim 8 wherein the fan shaft includes a first gear (82) positioned about a fan shaft and the first end portion of the first drive shaft includes a second gear (84) positioned about the first drive shaft, wherein the first and second gears are configured to engage with one another such that with the first and second gears engaged together the shaft and the first drive shaft rotate at the same time.

10. The improved aircraft auxiliary power and thrust unit of claim 9 further includes a clutch (90) associated with the second gear of the first drive shaft which moves the second gear into and out of engagement with the first gear.

11. The improved aircraft auxiliary power and thrust unit of claim 8 wherein the second end portion of the first drive shaft includes a third gear (86) positioned about the first drive shaft and the first end portion of the second drive shaft includes a fourth gear (88) positioned about the second drive shaft, wherein the third and fourth gears are configured to engage with one another such that with the third and fourth gears engaged together the first and second drive shafts rotate at the same time.

12. The improved aircraft auxiliary power and thrust unit of claim 11 further includes a clutch (92) associated with the fourth gear of the second drive shaft which moves the fourth gear into and out of engagement with the third gear.

13. The improved aircraft auxiliary power and thrust unit of claim 12 wherein the first drive shaft is positioned outside of the channel of the air intake assembly.

14. The improved aircraft auxiliary power and thrust unit of claim 1 wherein a second end portion of the second drive shaft engages a gearbox (96).

15. The improved aircraft auxiliary power and thrust unit of claim 14 wherein the gearbox is associated with auxiliary equipment (20).

16. The improved aircraft auxiliary power and thrust unit of claim 15 wherein the auxiliary equipment includes at least one of a hydraulic pressure system (52), an electrical generation system (54), and a compressor (48).

17. The improved aircraft auxiliary power and thrust unit of claim 14 wherein a clutch (98) is associated with the second end portion of the second drive shaft to engage and disengage the second drive shaft from the gearbox.

18. A method of operating an auxiliary power and thrust unit (10') of an aircraft, comprising the steps of:

initiating operation of the auxiliary power and thrust unit source (14) comprising at least one blade (56, 59, 61) mounted to a fan shaft (58) wherein the at least one blade and the fan shaft rotate relative to the aircraft; and applying the source to operate in one of two modes:

a first mode is the fan shaft is linked with a shaft assembly (100) comprising a first drive shaft (60) which directs rotational mechanical force in a first direction transverse to the fan shaft and a second drive shaft (64) linked to the first drive shaft which directs the rotational mechanical force received from the first drive shaft in a second direction transverse to the first direction wherein the second drive shaft is positioned outside of an air intake assembly (38) comprising an opening (40) in a tail cone (12) of the aircraft and a channel (16) in fluid communication with the opening and the fan; or a second mode wherein the shaft assembly is positioned disconnected from the fan shaft.

19. The method of operating an aircraft auxiliary power and thrust unit of claim 18 wherein a power setting for the source operating in the first mode is lower than a power setting for the source operating in the second mode.

20. The method of operating an auxiliary power and thrust unit of an aircraft of claim 18 wherein the at least one blade comprises a plurality of blades which further comprises a plurality of compressor blades and a plurality of turbine blades and removably mounted to the shaft a plurality of fan blades.

21. The method of operating an auxiliary power and thrust unit of an aircraft of claim 20 further including a clutch (63) positioned with respect to the shaft to remove the plurality of fan blades from being mounted to the shaft.

22. The method of operating an auxiliary power and thrust unit of claim 21 wherein with the source operating in the first mode the plurality of fan blades are removed from being mounted to the shaft with the clutch.

23. The method of operating an auxiliary power and thrust unit of claim 21 wherein with the source operating in the second mode the plurality of fan blades are mounted through the clutch to the shaft.

24. The method of operating an aircraft auxiliary power and thrust unit of claim 18 wherein the second drive shaft in the first mode is linked to auxiliary equipment (20).

* * * * *